R. A. REGISTER.
HUSKING MACHINE.
APPLICATION FILED JULY 3, 1920.
1,412,489.
Patented Apr. 11, 1922.
5 SHEETS—SHEET 4.
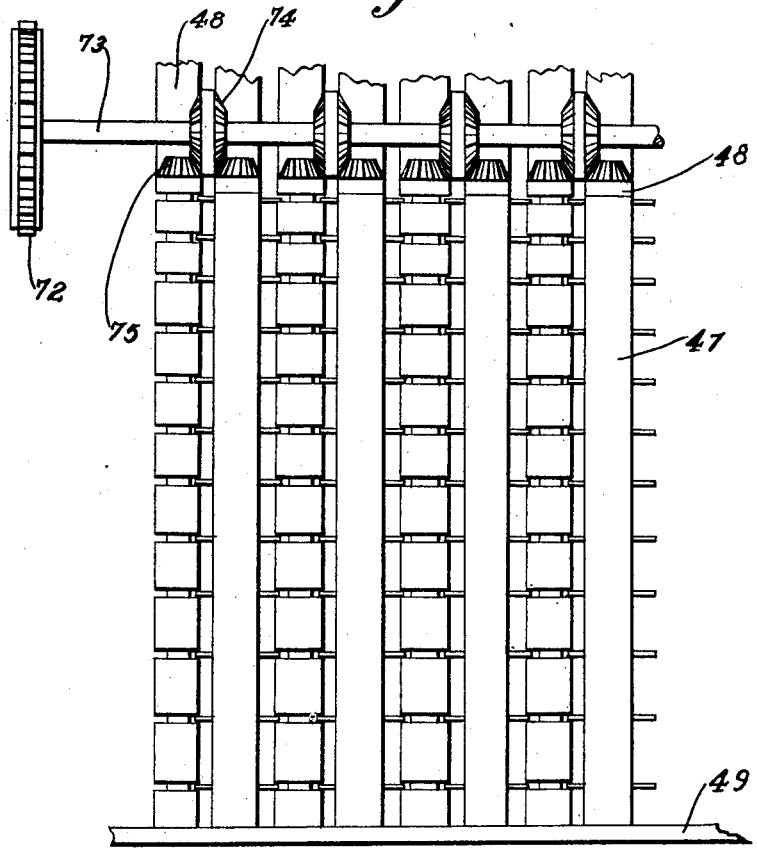
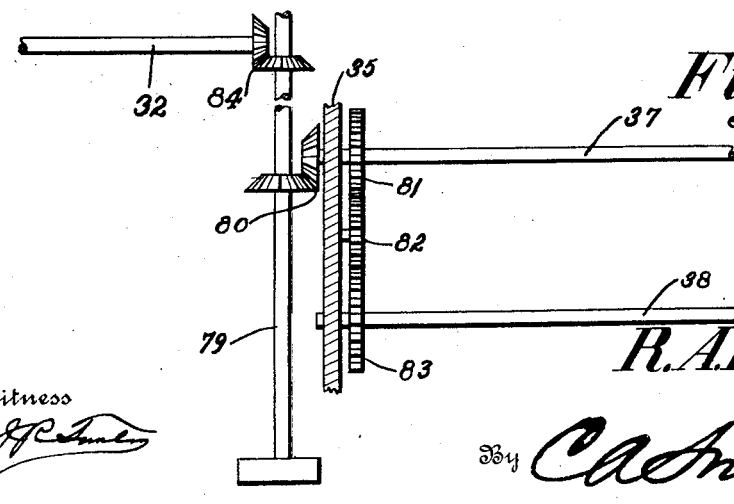

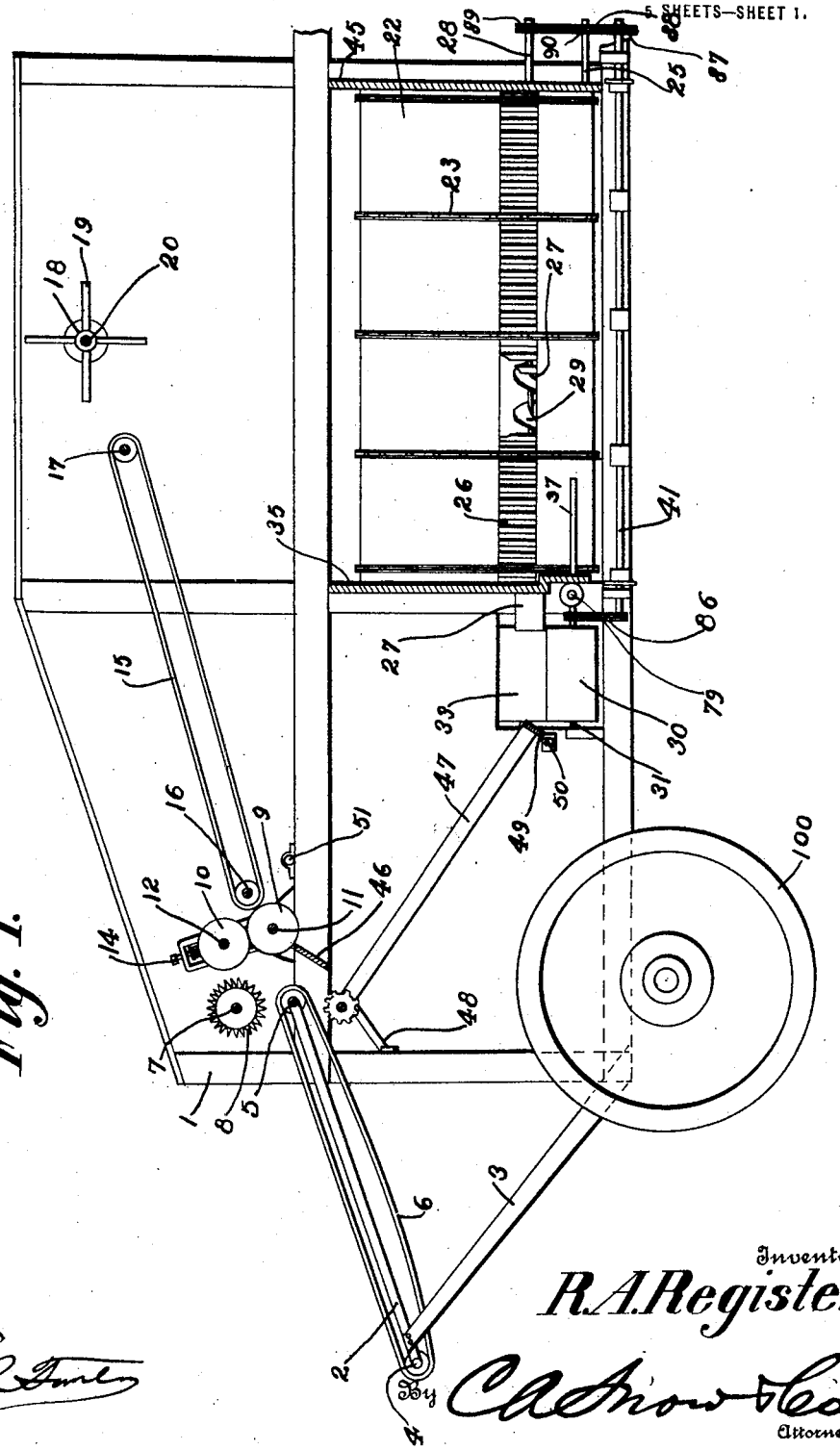

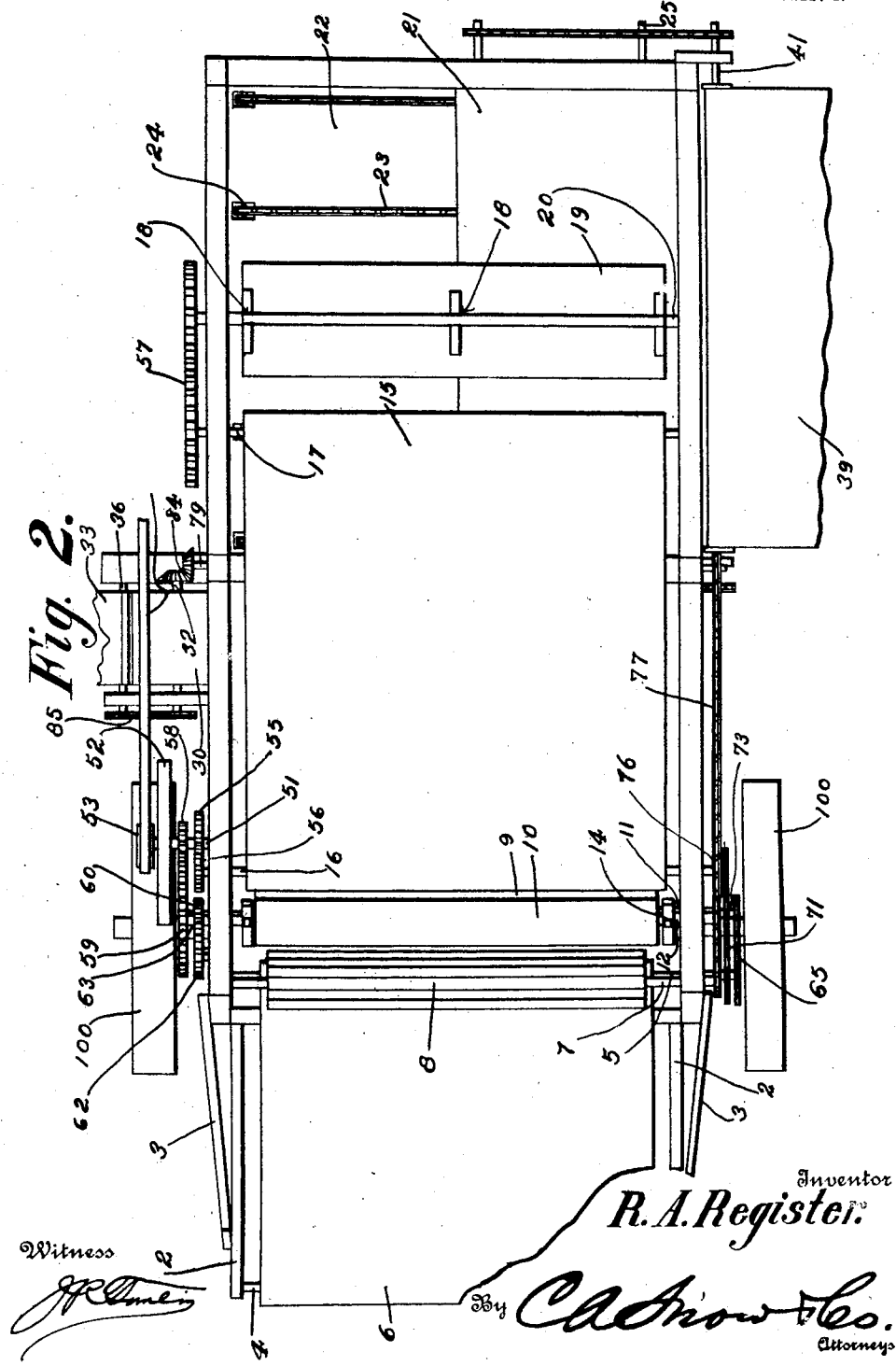

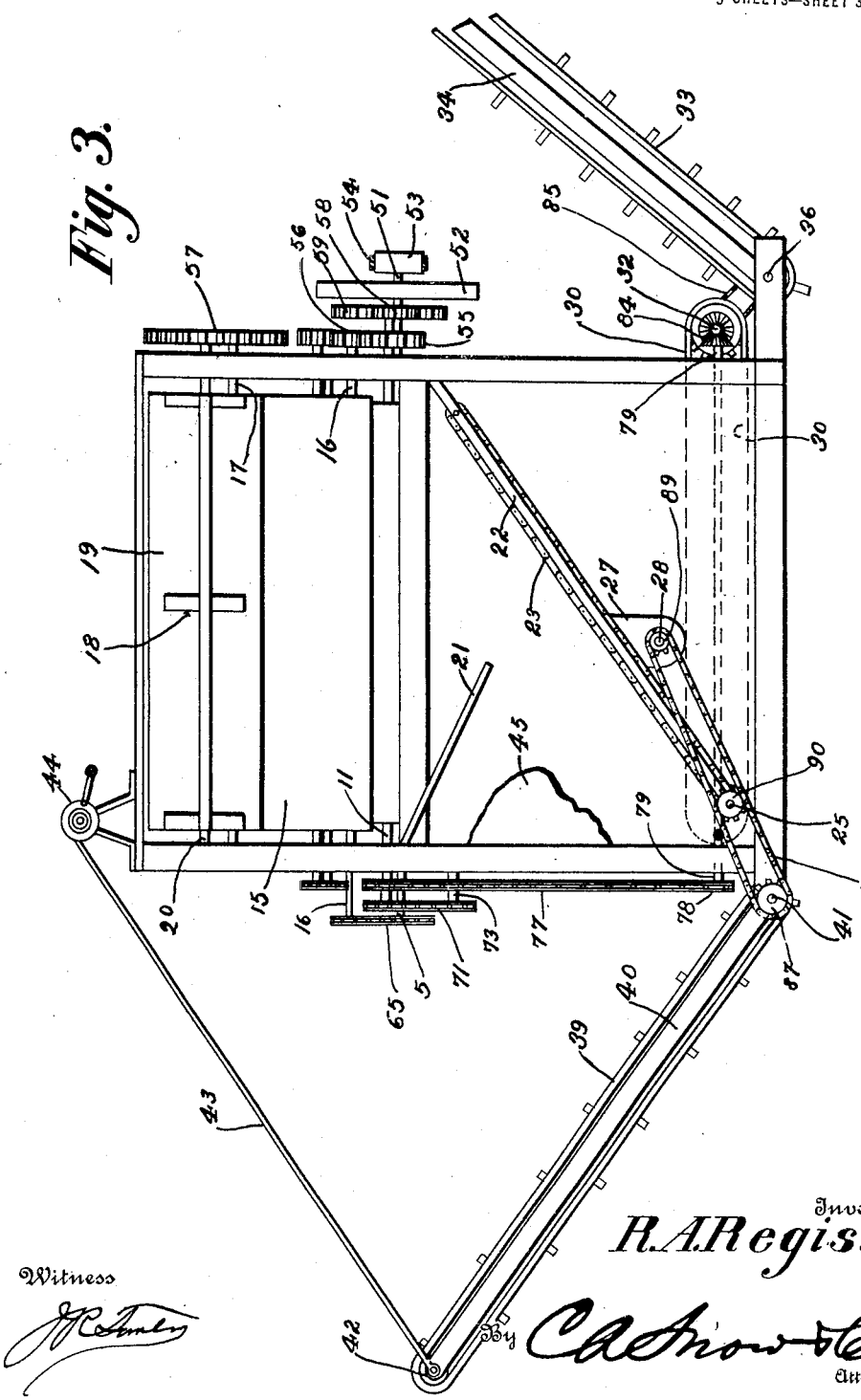

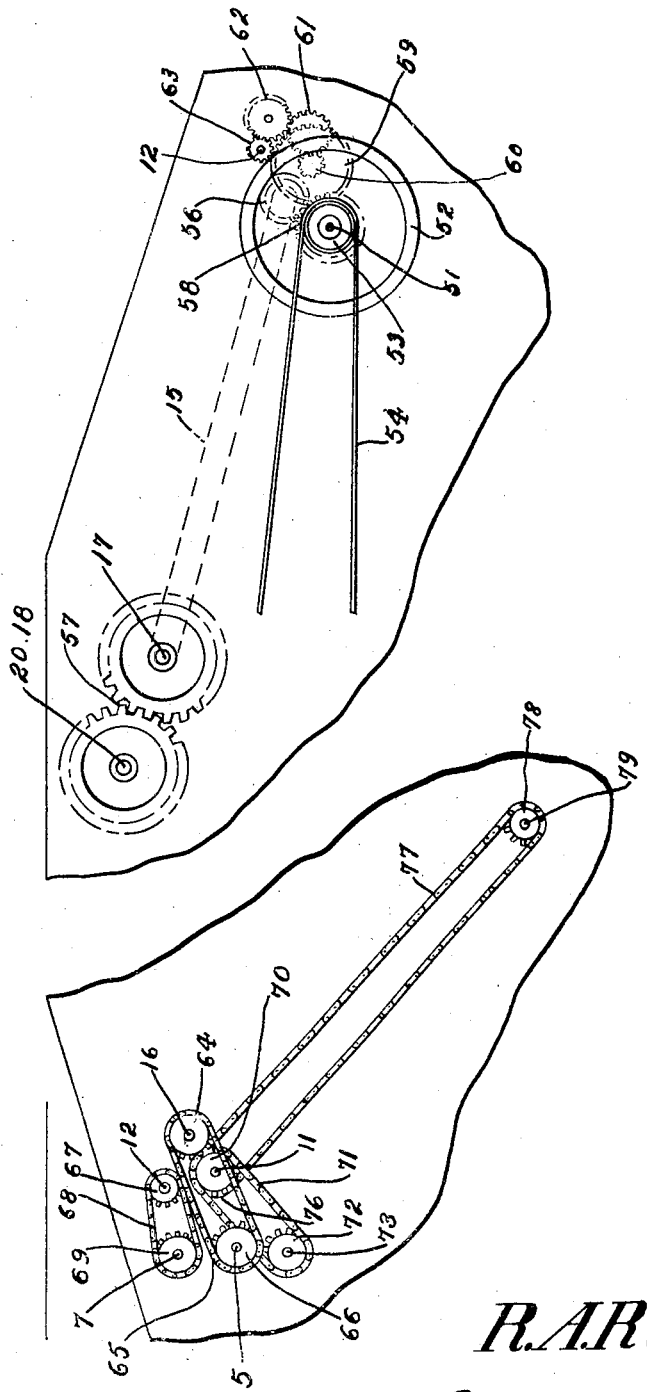

UNITED STATES PATENT OFFICE.

ROBERT A. REGISTER, OF EARLEVILLE, MARYLAND.

HUSKING MACHINE.

1,412,489.　　　　Specification of Letters Patent.　　Patented Apr. 11, 1922.

Application filed July 3, 1920. Serial No. 393,896.

*To all whom it may concern:*

Be it known that I, ROBERT A. REGISTER, a citizen of the United States, residing at Earleville, in the county of Cecil and State of Maryland, have invented a new and useful Husking Machine, of which the following is a specification.

The device forming the subject matter of this application is for husking corn, and the invention aims to provide a husking machine which may be moved about readily from place to place, it being possible to husk the corn in the field, with a minimum number of men.

The stalks are advanced into the machine and the ears together with the husks are snapped from the stalks. Thence, the material proceeds along diverging lines, the corn being husked, and the ears travelling out of the machine whereas the stalks are advanced away from the point of separation between the stalks and the ears, the stalks being transported out of the machine, and any grains of corn which may have fallen from the ears, being delivered back upon the mechanism which carries away the ears after they have been husked.

To construct a machine having the above and other desirable characteristics, is, generally stated, the object of the present invention.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a husking machine constructed in accordance with the invention, parts being left in elevation; Figure 2 is a top plan wherein parts are removed in order that the internal mechanism may be shown, parts being broken away; Figure 3 is an end elevation wherein parts have been removed in order that sundry portions of the mechanism may appear the more clearly; Figure 4 is a plan showing the husking rolls; Figure 5 is a fragmental sectional detail illustrating the packer and delivery shafts and cooperating parts; Figures 6 and 7 are side elevations, diagrammatic in nature, and illustrating sundry of the driving trains.

In carrying out the invention there is provided a main frame 1 constituting a part of a vehicle, the main frame 1 carrying ground wheels 100. The device, obviously may be made a part of a tractor, if desired. An auxiliary frame 2 projects forwardly from the main frame 1 and is sustained by braces 3. A shaft 4 is journaled at the outer ends of the braces 3, a shaft 5 being journaled on the frame 1, adjacent to the member 2. About the shafts 5 and 4 is trained a belt conveyor 6.

The stalks, with the ears thereon, are thrown on the conveyor 6 and are advanced, butt first, into the field of operation of a feeder roll 8 carried by a shaft 7 journaled on the frame 1. The feed roll 8 advances the stalks between a lower snapping roll 9 and an upper snapping roll 10, the lower snapping roll 9 being journaled on the frame 1 through the instrumentality of a shaft 11, the upper snapping roll 10 being carried by a shaft 12 yieldably and adjustably supported on the frame 1, as indicated at 14.

As the stalks pass between the snapping rolls 9 and 10, the ears of corn are detached from the stalks. The stalks move in one direction, and the ears move in another direction. The path traversed by the stalks will be traced out first, and then the path traversed by the ears will be set forth.

From the snapping rolls 9 and 10, the stalks pass upon a belt conveyor 15 carried by shafts 16 and 17 journaled in the main frame 1. By the conveyor 17 the stalks are advanced within the field of a rotary feed member 18 which may include blades 19 and a shaft 20, the shaft being journaled in the frame 1. When the butts of the stalks encounter the feed member 18, the butts are carried downwardly, and the stalks are turned end for end. A part of the stalks are deposited on a transverse downwardly inclined deflector 21 extended inwardly from the frame 1, as shown in Figure 3, some of the stalks falling on a downwardly inclined deck 22, disposed at an acute angle to the deflector 21 and extended beneath the deflector. The stalks on the deck 22 under ordinary circumstances will roll downwardly along the deck, but in order to avoid a clogging of the machine at the point indicated, the stalks are engaged by feed chains 23 extended longitudinally of the deck 22. The upper ends of the feed chains 23 are engaged with sprocket wheels 24 mounted in the deck 22 near the upper end thereof, as shown best in Figure 2, whereas the lower portions of the feed chains are engaged about a shaft 25, located relatively near to the bottom of the machine and at one side thereof, the shaft 25 being journaled in partitions 35 and 45 which extend transversely of the framework 1.

The deck 22 is supplied with openings 26, seen in Figure 1. If any grains of corn are detached from the ears and carried forwardly with the stalks, these grains pass through the openings 26 into a trough-shaped receiver 27 (compare Figures 1 and 3) located beneath the deck 22 and extended transversely thereof. A shaft 28 is journaled in one end of the receiver 27 and in the partition 35, and carries a feed screw 29 operating in the receiver. The loose grains of corn, having been delivered into the receiver 27, are advanced by the feed screw 29 onto a horizontal conveyor 30 extended transversely of the machine. The conveyor 30 is carried by shafts 31 and 32 journaled on the frame of the machine. From the horizontal conveyor 30, the grains of corn are deposited on an inclined conveyor 33 traversing a frame 34 mounted on a shaft 36 journaled in the frame 1, the shaft 36 constituting means for actuating the conveyor 33. The loose grains of corn are carried upwardly and out of the machine by the conveyor 33, the said conveyor serving to conduct away, also, the ears, after the stalks have been stripped therefrom, as will be described hereinafter.

The stalks which move downwardly along the deck 22, are bundled and bound by a binder mechanism of any desired sort. Since this bundling and binding mechanism may be of any kind adapted for the purposes intended, no specific form has been shown. Let it suffice to say, however, that the mechanism alluded to comprises a packer shaft 37 and a delivery shaft 38, journaled in the partitions 35 and 45, and shown in Figure 5 of the drawings, the shafts 38 and 37 being a part of a bundling and binding means. The corn stalks, having been bundled and bound, pass on an upwardly inclined conveyor 39 traversing a frame 40 mounted to swing on a shaft 41 journaled on the frame 1, the shaft 41 constituting means for actuating the conveyor 39. The conveyor 39 carries the bundled stalks upwardly and laterally away from the machine, and may be employed for depositing them upon a wagon. The belt conveyor 39 traverses an idler 42 on the upper or outer end of the frame 40. The angle between the frame 40 and a horizontal plane is adjusted through the instrumentality of a flexible element 43 engaged at one end with the outer end of the frame 40 and engaged at its other end around a windlass 44 or the like, mounted on the top of the frame 1.

The foregoing explanation traces out the path traversed by the stalks, as the same pass through the machine. It will now be pointed out in what manner the ears of corn are handled after they have been detached from the stalks by way of the snapping rolls 9 and 10.

From the snapping rolls 9 and 10, the ears of corn move downwardly on a deflector 46 extended transversely of the main frame 1 and connected thereto. The deflector 46 deposits the ears on husking rolls 47 extended longitudinally of the machine and inclined downwardly. The husking rolls 47 are shown in Figure 4 of the drawings, and it is to be understood that the husking rolls may be constructed as desired. At their upper ends, the husking rolls 47 are journaled on supports 48 extended inwardly from the forward end of the main frame 1, the lower, inner or rear ends of the husking rolls being journaled in a bearing bar 49, extended transversely of the frame 1 of the machine and connected to the side portions of the frame of the machine, as shown at 50 in Figure 1. The husks are removed from the ears by the action of the rolls 47, the husks dropping downwardly, and the ears moving longitudinally of the rolls, on the horizontal belt conveyor 30, the conveyor 30 passing the ears along to the upwardly inclined conveyor 33. The conveyor 33 carries the ears upwardly and out of the machine, along with any loose grains of corn which may have been detached.

The general construction of the machine has been outlined, and it remains to set forth the various driving trains whereby the parts above enumerated are actuated.

A power shaft 51 is mounted to rotate on the frame 1, and is actuated by any suitable means, such as a belt 54 and a pulley 53, the shaft 51 carrying a fly wheel 52. There is a gear wheel 55 on the shaft 51, the said gear wheel meshing into a pinion 56 on one end of the conveyor shaft 16. The conveyor shaft 17 (Figs. 1, 2 and 7) is connected to the shaft 20 of the feed member 18 by intermeshing gear wheels 57.

In view of the foregoing, one of the driving trains includes a shaft 51, the gear wheel 55, the pinion 56, the shaft 16, the conveyor 15, the shaft 17, the gear wheels 57 and the rotatable feed member 18 which is mounted on the shaft 20.

The shaft 51 carries a pinion 58 meshing into a gear wheel 59 on the shaft 11. The shaft 11 carries a smaller gear wheel 60 meshing into an idle gear 61 journaled on the frame 1, the idle gear meshing into an idle gear 62, which, in turn, meshes into a gear wheel 63 on the shaft 12 which carries the upper snapping roll 10.

The parts last above described constitute a gear train including a shaft 51, the pinion 58, the gear wheel 59, the shaft 11, the snapping roll 9, the gear wheel 60, the idle gear 61, the idle gear 62, the gear wheel 63, the shaft 12 and the upper snapping roll 10, it being observed that the snapping rolls 9 and 10 are rotated in opposite directions.

On the shaft 16 there is a sprocket wheel 64 connected by a sprocket chain 65 with a sprocket 66 on the shaft 5 of the conveyor 6.

The parts alluded to last above constitute a driving train for the conveyor 6, comprising the shaft 16, the sprocket wheel 64, the sprocket chain 65, the sprocket wheel 66, and the shaft 5, the conveyor 6 thus being operated so as to advance the stalks toward the feed roll 8 and the snapping rolls 9 and 10 as hereinbefore set forth.

The shaft 12 carries a sprocket wheel 67 about which is trained a sprocket chain 68 coacting with a sprocket wheel 69 on the shaft 7. The driving train for the feed roll 8 includes, obviously, the shaft 12, the sprocket wheel 67, the sprocket chain 68, the sprocket wheel 69 and the shaft 7 which carries the feed roll 8.

The shaft 11 is supplied with a sprocket wheel 70 cooperating with a sprocket chain 71 engaged with a sprocket wheel 72 on a shaft 73 (Fig. 4). The shaft 73 is journaled in the framework 1 of the machine and is provided with beveled gears 74 cooperating with beveled gears 75 on the upper ends of the husking rolls 47.

The driving mechanism for the husking rolls 47 includes the shaft 11, the sprocket wheel 70, the sprocket chain 71, the sprocket wheel 72, the shaft 73, the beveled gears 74 and the beveled gears 75 on the upper ends of the husking rolls 47.

The shaft 11 carries a sprocket wheel 76 engaged by a sprocket chain 77 cooperating with a sprocket wheel 78 on a shaft 79 (Figure 5) journaled in the framework of the machine, the shaft 79 being connected by beveled pinions 80 with the packer shaft 37, the packer shaft 37 being operatively connected with the delivery shaft 38 through the instrumentality of a gear 81 on a shaft 37, a gear 83 on the shaft 38, and an idle gear journaled on the partition 35 and meshing with the gears 81 and 83, the idle gear being designated by the numeral 82.

The driving train for the bundling and binding mechanism comprises the shaft 11, the sprocket wheel 76, the sprocket chain 77, the sprocket wheel 78, the shaft 79, the beveled pinions 80, the shaft 37, the gear wheels 81, 82 and 83, and the shaft 38.

The shaft 79 is connected with the shaft 32 by beveled pinions 84. A sprocket chain 85 (Fig. 3) connects the shaft 32 with the shaft 36.

The parts last above described, taken in order, include the shaft 79, the beveled pinions 84, the shaft 32, which drives the horizontal conveyor 30, the sprocket chain 85 and the shaft 36 which drives the upwardly inclined conveyor 33.

Passing to Figure 1 of the drawing, it will be observed that a sprocket chain 86 connects the shaft 41 with the shaft 31 so that there is established a driving train including the shaft 32, the horizontal conveyor 30, the shaft 31, the sprocket chain 86, the shaft 41 and the upwardly inclined conveyor 39.

On the shaft 41 is located a sprocket wheel 87 engaged by a sprocket chain 88 operating with the sprocket wheel 89 on the shaft 28. The shaft 25 has a sprocket wheel 90 cooperating with the sprocket chain 88.

In view of the foregoing, the feed screw 29 in the receiver 27 is driven by the shaft 28, the sprocket wheel 89, the sprocket chain 88, the sprocket wheel 87 and the shaft 41. The chain 88 carries the shaft 25 by way of the sprocket wheel 90, and when the shaft 25 is rotated, the feed chains 23 are advanced along the deck 22.

By way of résumé, it may be stated that the stalks and the ears of corn are advanced by the conveyor 6 and the member 7 to the snapping rolls 9 and 10. Here, the ears of corn are detached and pass downwardly on the husking rolls 47 where the husks are removed, the ears of corn being carried away laterally out of the machine by the conveyors 30 and 33. The stalks are advanced by the conveyor 15 and are passed downwardly by the rotary member 18 onto the deflector 21 and the deck 22. The chains 23 advance the stalks to the bundling and tying mechanism represented by the shafts 38 and 37, the stalks ultimately passing upon the conveyor 39 which carries the stalks out of the machine. Loose grain passes through the openings 26 in the deck 22 into the receiver 27, the feed screw 29 carrying the loose grains upon the horizontal conveyor 30 from which the loose grains, along with the husked ears, travel upon the conveyor 33.

Having thus described the invention, what is claimed is:—

1. In a device of the class described, a frame; a deck inclined transversely of the frame; snapping rolls on the frame; a conveyor operating between the snapping rolls and the deck; and a rotary feeding member carried by the frame at one end of the conveyor and above the deck.

2. In a device of the class described, a frame; a deck inclined transversely of the frame; a deflector inclined transversely of the frame and discharging on the deck; a feeding means traversing the deck; a snapping means; mechanism for conveying the stalks from the snapping means to a point above the deflector and the deck; and mechanism for turning the stalks downwardly from said mechanism, upon the deck and the deflector.

3. In a device of the class described, a frame; a deck inclined transversely of the frame; snapping means on the frame; husking means cooperating with the snapping means; mechanism for conveying the stalks from the snapping means to the deck; a conveyor receiving the ears from the husking means; and mechanism for carrying loose grains from the deck to the conveyor.

4. In a machine of the class described, a frame; a husking means on the frame; snapping means carried by the frame and discharging the unhusked ears upon the husking means; a conveyor mounted on the frame and receiving the husked ears from the husking means; a deck carried by the frame and inclined to facilitate the passage of stalks therealong, the deck being perforated to permit loose grains among the stalks to pass through the deck; mechanism on the frame for transporting the stalks from the snapping means to the deck; and means for transporting the grains to the said conveyor, after the grains have passed through the deck, whereby the grains will leave the machine with the husked ears.

5. In a machine of the class described, a frame; a husking means on the frame; snapping means carried by the frame and discharging the unhusked ears upon the husking means; a conveyor mounted on the frame and receiving the husked ears from the husking means; a deck carried by the frame and perforated to permit loose grains among the stalks to pass through the deck; mechanism on the frame for transporting the stalks from the snapping means to the deck; a conveyor traversing the deck; and means for transporting the grains to the first specified conveyor, after the grains have passed through the deck, whereby the grains will leave the machine with the husked ears.

In testimony that I claim the foregoing as my own, I have hereto affixed my signature in the presence of two witnesses.

ROBERT A. REGISTER.

Witnesses:
JOHN C. ROWAN,
W. H. JONES.